United States Patent [19]

Kuwayama

[11] 4,388,833
[45] Jun. 21, 1983

[54] DIFFERENTIAL PRESSURE GAUGE

[75] Inventor: Hideki Kuwayama, Tokyo, Japan

[73] Assignee: Kabushiki Kaisha Hokushin Denki Seisakusho, Tokyo, Japan

[21] Appl. No.: 217,594

[22] Filed: Dec. 18, 1980

[30] Foreign Application Priority Data

Jan. 7, 1980 [JP] Japan .............................. 55-336[U]

[51] Int. Cl.³ .............................................. G01L 9/12
[52] U.S. Cl. ........................................ 73/718; 73/724; 361/283
[58] Field of Search ................. 73/718, 724, 706, 708; 361/283

[56] References Cited

U.S. PATENT DOCUMENTS

| 3,691,842 | 9/1972 | Akeley ............................. 73/718 |
| 4,257,274 | 3/1981 | Shimada et al. ................. 73/718 |
| 4,262,540 | 4/1981 | Tamai et al. ..................... 73/718 |

FOREIGN PATENT DOCUMENTS

| 52-23978 | 2/1977 | Japan ................................. 73/718 |
| 52-47705 | 5/1977 | Japan ................................. 73/718 |
| 52-47706 | 6/1977 | Japan ................................. 73/718 |

Primary Examiner—Donald O. Woodiel
Attorney, Agent, or Firm—Pollock, Vande Sande & Priddy

[57] ABSTRACT

A tubular body is closed at both ends by first and second plate-like members, respectively and a transducer for converting a deflection into an electric signal is provided between the first and second plate-like members. A through hole is made in at least one of the plate-like members and, on the outside of the plate-like member, a pressure receiving member is disposed. A pressure received by the pressure receiving member is transmitted to the transducer to deflect its moving part. When an overpressure larger than a measuring pressure is applied to the pressure receiving member to deflect it in excess of a predetermined value, the deflection is limited by one of the plate-like members to define a space between the plate-like member and the transducer, thereby to prevent the transducer from being affected by the overpressure received by the plate-like member.

16 Claims, 6 Drawing Figures

DIFFERENTIAL PRESSURE GAUGE

BACKGROUND OF THE INVENTION

The present invention relates to a differential pressure gauge which has incorporated therein a displacement transducer for producing a displacement corresponding to a differential pressure and converting the displacement into an electric signal.

There has heretofore been employed a detector of the type that receives pressure by a pressure receiving member such as a diaphragm or bellows and transmits the pressure to a displacement transducer wherein a displacement corresponding to the pressure is produced to change an electrostatic capacitance or inductance in accordance with the displacement, thus converting the displacement into an electric signal to detect the pressure or a vacuum, or a difference between two external pressures. In order to protect the pressure receiving member from an overpressure larger than a measuring pressure, the detector is provided with means for limiting the deflection of the pressure receiving member in excess of a predetermined value. The limiting means used in the prior art receives the deflection of the pressure receiving member on the outer wall of the displacement transducer. In the detector of the type employing the bellows as the pressure receiving member, an external pressure is applied directly to the outer wall of the displacement transducer. With such arrangements, in the conventional differential pressure gauge, when an overpressure larger than the measuring pressure is applied, a large force is imparted to the displacement transducer to deform it and, even after the external pressure is removed, the transducer would not completely restore its original form. This exerts adverse influence on the characteristic of the differential pressure gauge.

Accordingly, it is an object of the present invention to provide a differential pressure gauge which is adapted so that its detecting characteristic is free from the bad influence of overpressure.

Another object of the present invention is to provide a differential pressure gauge which is free from the influence of overpressure on its detecting characteristic and which is easy to manufacture.

Yet another object of the present invention is to provide a differential pressure gauge which is easy to fabricate and is hardly affected by temperature variations and so forth.

SUMMARY OF THE INVENTION

A tubular body is closed at both ends by first and second plate-like members, between which is provided a displacement transducer for converting a displacement into an electric signal. At least one of the plate-like members has formed therein a through hole, on the outside of which is provided a pressure receiving member and pressure received by the pressure receiving member is transmitted to the displacement transducer. In the displacement transducer its movable member is deflected to change an electrostatic capacitance or inductance, thereby converting the deflection into an electric signal. In the present invention, when an overpressure is applied to the pressure receiving member, the plate-like member confronting the pressure receiving member prevents it from deflecting in excess of a predetermined value to maintain an air gap between the plate-like member and the displacement transducer. Accordingly, even if a large force is applied by an overpressure through the pressure receiving member or directly to the plate-like member to deform it, there is no fear of deformation of the displacement transducer because of the presence of the abovesaid air gap. This ensures that the detecting characteristic of the differential pressure gauge will not be adversely affected by the application of overpressures.

Since the air gap is defined between the plate-like member and the displacement transducer to prevent the application of a large force to the transducer even in the case of an overpressure being applied, as described above, the arrangement for supporting the transducer is simplified. For instance, an insulating member is fitted into a ring, the ring is mounted in the tubular body so that the insulating member is disposed opposite the plate-like member with the aforesaid air gap defined therebetween, and the displacement transducer is held by the insulating member. That is, there is no need of fitting and holding the insulating member between cup-shaped support members of metal; accordingly, there are no possibilities that air remaining inside as a result of fitting of the insulating member undergoes a temperature change to exert influence on the detection characteristic of the differential pressure gauge. Also it is possible to insulate the displacement transducer from the tubular body, by which the influence of noise can mostly be eliminated.

DESCRIPTION OF THE PREFERRED EMBODIMENT

Figures 1, 2:
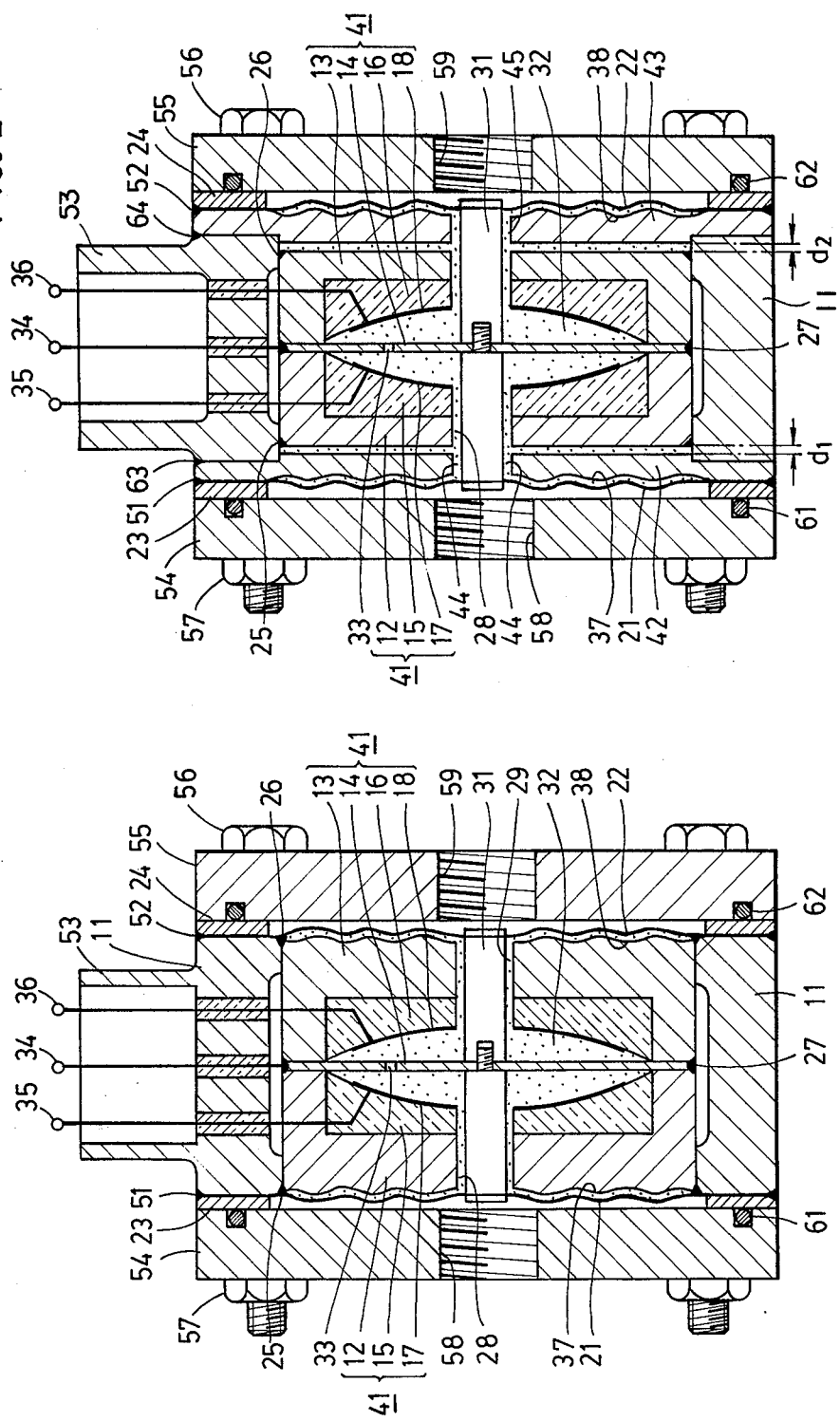
FIG. 1 is a sectional view showing a conventional differential pressure gauge.
FIG. 2 is a sectional view illustrating an embodiment of the differential pressure gauge of the present invention which employs an electrostatic capacitance type as the displacement transducer and a coupling shaft as pressure transmitting means.

To facilitate a better understanding of the present invention, a description will be given first of a prior art differential pressure gauge. FIG. 1 shows a conventional differential pressure gauge employing an electrostatic capacitance type transducer. In a square-shaped, metal body 11 having bored therethrough a round hole, cup-shaped electrode support members 12 and 13 made of metal are fitted in opposing relation to each other, with the end faces of their open end portions gripping therebetween the marginal portion of a plate spring 14. In the internal space defined by the electrode support members 12 and 13 are embedded disc-like insulating members 15 and 16 as of ceramic and the surfaces of the insulating members 15 and 16 facing the plate spring 14 are curved to form slightly concave surfaces. On the concave surfaces, except at their peripheral portions, fixed electrodes 17 and 18 are respectively formed, for example, by metal evaporation. The marginal edges of the outer end faces of the electrode support members 12 and 13 are welded to the body 11 as indicated by 25 and 26. Disposed adjacent the outer end faces of the electrode support members 12 and 13 are diaphragms 21 and 22, whose marginal portions are welded to both end faces of the body 11 together with metal seal rings 23 and 24 as indicated by 51 and 52. The outer peripheral surfaces of the electrode support members 12 and 13 and the plate spring 14 are welded together as indicated by 27. The electrode support members 12 and 13 and the insulating members 15 and 16 respectively have bored therethrough centrally disposed holes 28 and 29. A coupling shaft 31 inserted into the center holes 28 and 29 passes through the center of the plate spring 14 and is fixed thereto at its intermediate portion, and its opposing end faces are respectively secured to the diaphragms 21 and 22 centrally thereof. A space defined by the body 11 and the diaphragms 21 and 22 is filled with an incompressible fluid 32 such as silicon oil. The plate spring 14 has made therein a small hole 33 so that both sides of the plate spring 14 are held under the same pressure. A terminal 34 of the plate spring 14 is led out of the body 11 and terminals 35 and 36 of the fixed electrodes 17 and 18 are also led out of the body 11 while being electrically insulated from the electrode support members 12 and 13 and the body 11. These terminals 34 to 36 are positioned in a terminal box 53 which is formed on the outside of the body 11 as a unitary structure therewith. The diaphragms 21 and 22 are corrugated with their corrugations formed concentrically with one another, and the outer end faces of the electrode support members 12 and 13 are also corrugated, as indicated by 37 and 38, so that they conform to the corrugated diaphragms 21 and 22, respectively. To the both end faces are respectively attached flanges 54 and 55. Bolts 56 are inserted into through holes (not shown) made in the body 11 at its four corners and nuts 57 are tightened on the bolts 56 to secure the flanges 54 and 55 to the body 11. The flanges 54 and 55 respectively have pressure inlet ports 58 and 59 centrally thereof and pipes (not shown) are threadably engaged with screws cut in the inner peripheral surfaces of the pressure inlet ports 58 and 59 so that fluids to be measured are introduced to the outsides of the diaphragms 21 and 22. The abutting faces of the flanges 54 and 55 and the body 11 are sealed, for instance, by O-rings 61 and 62, respectively.

When fluid pressures are applied to the diaphragms 21 and 22, the pressures are transmitted to the plate spring 14 through the coupling shaft 31 to deflect the central portion of the plate spring 14 in accordance with a difference between the two pressures. As a consequence, the distances between the plate spring 14 and the fixed electrodes 17 and 18 differentially vary and consequently electrostatic capacitances between the plate spring 14 and the fixed electrodes 17 and 18 also differentially vary. These electrostatic capacitances are detected across the terminal 34 and the terminals 35 and 36, respectively.

In this differential pressure gauge, when the diaphragm 21 (or 22) is deflected in excess of a predetermined value by an overpressure larger than a measuring pressure, the diaphragm 21 (or 22) is received by the electrode support member 12 (or 13) to prevent the diaphragm 21 (or 22) from being degraded in its characteristic or damaged, thus protecting it. But once the overpressure is applied to the electrode support member 12 (or 13) through the diaphragm 21 (or 22) to deform the electrode support member 12 (or 13), it cannot completely be restored to its original configuration. This has a bad influence on the detection characteristic of the differential pressure gauge. The electrode support members 12 and 13 are usually welded to the body 11 after being formed to have the corrugations 37 and 38 and, because of the welding, the welded portions 25 and 26 are apt to become out of shape, so that it is necessary to shape the welded portions 25 and 26 into correct corrugated surfaces by cutting. In addition, this cutting work reduces the reliability of the mechanical strength of the welded portions 25 and 26.

FIG. 2 illustrates an embodiment of the differential pressure gauge of the present invention, in which the parts corresponding to those in FIG. 1 are identified by the same reference numerals. (This also applies to FIGS. 3 to 6.) In this embodiment, a displacement transducer 41 which is incorporated in the body 11 is the type that converts the deflection into an electrostatic capacitance as is the case with FIG. 1. The transducer 41 comprises the electrode support members 12 and 13, the plate spring 14, the insulating members 15 and 16 and the fixed electrodes 17 and 18. In the present embodiment, plate-like members 42 and 43 formed of a rigid material, for example, metal, are secured to both end faces of the body 11 on the outside of the displacement transducer 41. The plate-like members 42 and 43 are spaced respectively by distances $d_1$ and $d_2$ from the electrode support members 12 and 13, respectively have made centrally thereof through holes 44 and 45 which are aligned with the central holes 28 and 29, and the coupling shaft 31 is inserted into the through holes 44 and 45. The plate-like members 42 and 43 are respectively welded at marginal edges of their end faces to the body 11 as indicated by 63 and 64. On the outside of the plate-like members 42 and 43, the diaphragms 21 and 22 are welded thereto together with the rings 23 and 24. The outer end faces of the electrode support members 12 and 13 are not corrugated, instead, the outer surfaces of the plate-like members 42 and 43 are corrugated as indicated by 37 and 38. The distances $d_1$ and $d_2$ are selected such that even if the diaphragms 21 and 22 are urged against the plate-like members 42 and 43 by an overpressure larger than the measuring pressure to deflect them, the plate-like members 42 and 43 will not make contact with the displacement transducer 41. The internal space surrounded by the diaphragms 21 and 22 and the body 11 is filled with the fluid 32.

It will easily be understood that also in the embodiment of FIG. 2, when pressures are applied to the diaphragms 21 and 22, the plate spring 14 deflects corresponding to the differential pressure to detect it as a change in the electrostatic capacitance. In this embodiment, when an overpressure exceeding the measuring pressure is applied to the diaphragm 21 or 22, it greatly deflects into contact with the plate-like member 42 or 43 to apply thereto the overpressure. Since the plate-like members 42 and 43 are spaced away from the displacement transducer 41, the overpressure is not applied to the electrode support member 12 or 13 and the insulating members 15 or 16. Accordingly, even if an overpressure is applied, the detection characteristic is not adversely affected. Since the electrode support members 12 and 13 and the plate-like members 42 and 43 are respectively welded to the body 11 at the positions 25, 26 and 63, 64 away from the corrugated surfaces 37 and 38, it is not necessary to correct the corrugated surfaces 37 and 38 after welding and there is no fear of lowering the reliability of the mechanical strength of the welded portions.

The plate spring 14 can be made of a resilient material that has a constant elastic coefficient over a wide range of temperature, for example the material commercially known under the name of Ni-Span C (by International Nickel Company of U.S.A.); the electrode support members 12 and 13 are made of the same material as the plate spring 14 or Kovar; and the insulating members 15 and 16 can be made of a ceramic material such as alumina porcelain, or hard glass, whose thermal expansion coefficient is equal or close to that of the plate spring 14 and the electrode support members 12 and 13. The body 11 and the plate-like members 42 and 43 are usually made of the same material and stainless steel is suitable therefor.

Figure 3:
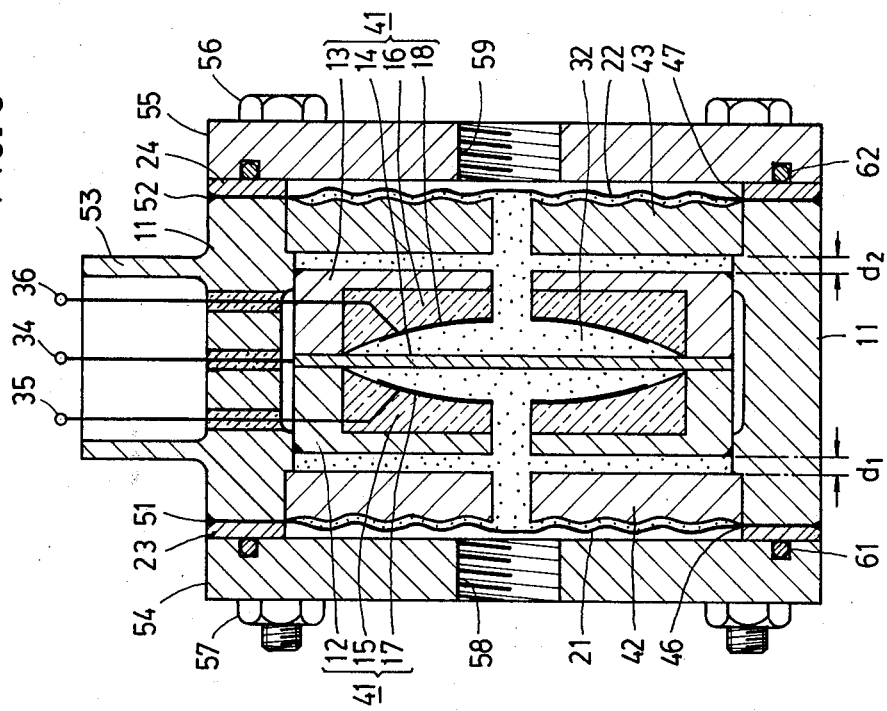
FIG. 3 is a sectional view showing a modified form of the embodiment of FIG. 2 which employs a sealed fluid as the pressure transmitting means.

The plate-like members 42 and 43 may be secured to the body 11 on the inside thereof, rather than at the end faces thereof. For example, as shown in FIG. 3, the plate-like members 42 and 43, each having a male screw cut in its outer peripheral surface, are respectively screwed into both end portions of the body 11, each having a female screw cut in its interior surface. Also in this case, the plate-like members may be fixed by welding to the body. Further, in this embodiment the coupling shaft 31 is omitted and the small hole 33 is not made in the plate spring 14; namely, the internal space defined in the displacement transducer is separated by the plate spring 14 into two sections, and pressures applied to the diaphragms 21 and 22 are transmitted to the plate spring 14 through the sealed fluid 32. Also the embodiment of FIG. 3 may be arranged so that the pressures are transmitted to the displacement transducer 41 through the coupling shaft 31 as in the embodiment of FIG. 2. Conversely, in the embodiment of FIG. 2 it is also possible to omit the coupling shaft 31, close the small hole 33 and transmit the pressures to the plate spring 14 through the sealed fluid 32.

Figure 4:
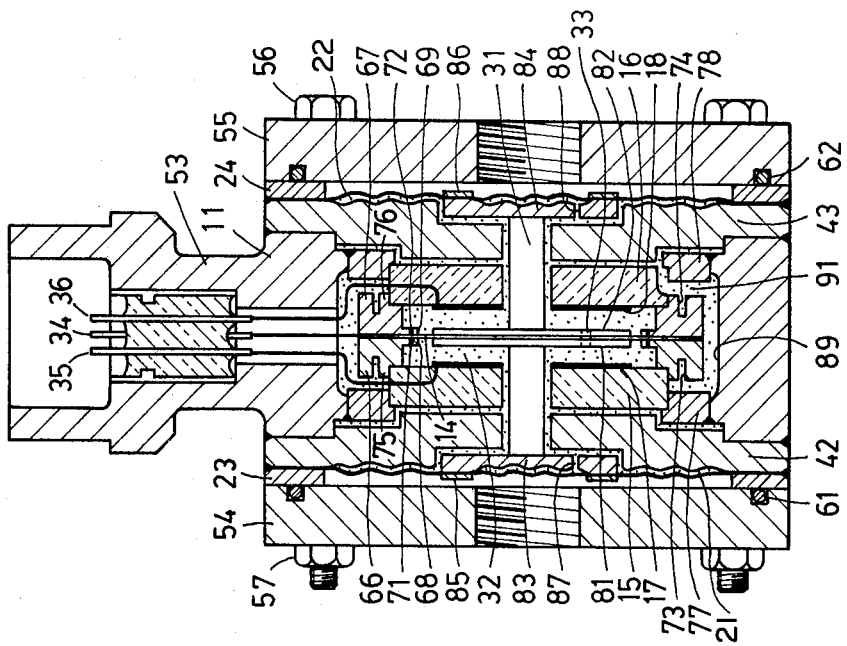
FIG. 4 is a sectional view showing another modification of the embodiment of FIG. 2 which employs a modified arrangement for supporting the displacement transducer and temperature compensating means.

The insulating members 15 and 16 may also be secured to the body 11 in a manner such as is shown in FIG. 4, in which the insulating members 15 and 16 are fixedly fitted into fixing rings 66 and 67 made of metal, with the fixed electrodes 17 and 18 facing each other, and the marginal portion of the plate spring 14 is gripped between the rings 66 and 67. In the illustrated example, flanges 68 and 69 are respectively formed integrally with the rings 66 and 67 on the inside thereof in contact with the end faces of the plate spring 14 and the rings 66 and 67 are welded to the plate spring 14 at the flanges 68 and 69, as indicated by 71 and 72, respectively. By this welding a sufficient initial tension can be imparted to the plate spring 14. Circular slits 73 and 74 are respectively cut in the rings 66 and 67 on the opposite side from the plate spring 14 to form inside the slits 73 and 74 rims 75 and 76 of reduced rigidity in their radial direction. The insulating members 15 and 16 are respectively pressed into the rims 75 and 76 and fixed to the rings 66 and 67. In this case, forces by the press fit of the insulating members 15 and 16 are absorbed by the rims 75 and 76 and have no affect on the initial tension imparted to the plate spring 14. The slits 73 and 74 are formed deeper than the inner end faces of the insulating members 15 and 16 fitted in the rims 75 and 76 as mentioned above. It is preferred that the rings 66 and 67 be made of the same resilient material as the plate spring 14.

The peripheral surfaces of the rings 66 and 67 may also be fixed to the body 11, for example, by means of welding. As shown in FIG. 4, however, the insulating members 15 and 16 are respectively fitted in outer rings 77 and 78 of metal on the sides opposite from the fixed electrodes 17 and 18 and the outer rings 77 and 78 are fixed as by welding to the body 11. Further, the coupling shaft 31 is linked with the plate spring 14 but electrically isolated therefrom, though not shown. Alternatively, the coupling shaft 31 can be made of such insulation materials as ceramic, polyimide resin and the like. The terminal 34 of the plate spring 14 can also be led out while attaining its electrical insulation from the body 11, thereby ensuring that the detection of a pressure is almost free from the influence of noise. The outer rings 77 and 78 are made of a material of substantially the same thermal expansion coefficient as the insulating members 15 and 16. In the case where the insulating members 15 and 16 are embedded in the cup-shaped electrode support members 12 and 13, respectively, as shown in FIGS. 2 and 3, air may happen to remain between the electrode support members and the insulating members and there is the possibility that the air expands and contracts in response to temperature variations to exert a bad influence on the detection characteristic; however, the arrangement shown in FIG. 4 is free from such a possibility because the rings 66 and 67 and the outer rings 77 and 78 are used to hold the insulating members 15 and 16 instead of using the electrode support members 12 and 13. Moreover, when the plate spring 14 is held by the electrode support members 12 and 13, the plate spring 14 is electrically connected with the body 11 and hence is readily affected by noise.

In FIGS. 2 and 3 the plate spring 14 itself is made a movable electrode, but in FIG. 4 electrode plates 81 and 82 are mounted on both sides of the plate spring 14. In this case, the fixed electrodes 17 and 18 are disposed in parallel with the plate spring 14. Also in FIG. 2, the fixed electrodes 17 and 18 may be formed in parallel with the plate spring 14. Furthermore, in FIG. 4 the central portion of one side of each of discs 83 and 84 is affixed to each end face of the coupling shaft 31 and the intermediate portions of the diaphragms 21 and 22 are welded to the marginal portions of the other sides of the discs 83 and 84 along with press springs 85 and 86, respectively. The discs 83 and 84 have made therein communicating holes 87 and 88 and the sealed fluid 32 is also filled in the spaces between the diaphragms 21 and 22 and the discs 83 and 84. When the sealed fluid 32 expands or contracts in response to a temperature change, those parts of the diaphragms 21 and 22 confronting the discs 83 and 84 move away from or towards them, preventing that the pressure of the fluid 32 undergoes great changes. In other words, temperature compensating means is provided. This temperature compensating means may be provided in the differential pressure gauge shown in FIG. 2; conversely, this means may be omitted from the differential pressure gauge of FIG. 4.

The surfaces of the discs 83 and 84 facing the diaphragms 21 and 22 have the same corrugations as the diaphragms 21 and 22. When an overpressure is applied to the diaphragm 21 or 22, not only the diaphragm 21 or 22 but also the disc 83 and 84 are pressed against the plate-like member 42 and 43. In order to insulate the body 11 and the rings 66 and 67 from each other, a recess or groove 89 is formed in the inner surface of the body 11 over the entire circumference thereof. A communicating hole 91 is made in the insulating member 16 to extend from between it and the plate-like member 43 to the recess 89 and the sealed fluid 32 is also filled in the recess 89, so that no pressure difference is produced between the inside and the outside of the rings 66 and 67 to prevent them from being deformed by the pressure difference.

Figure 5:
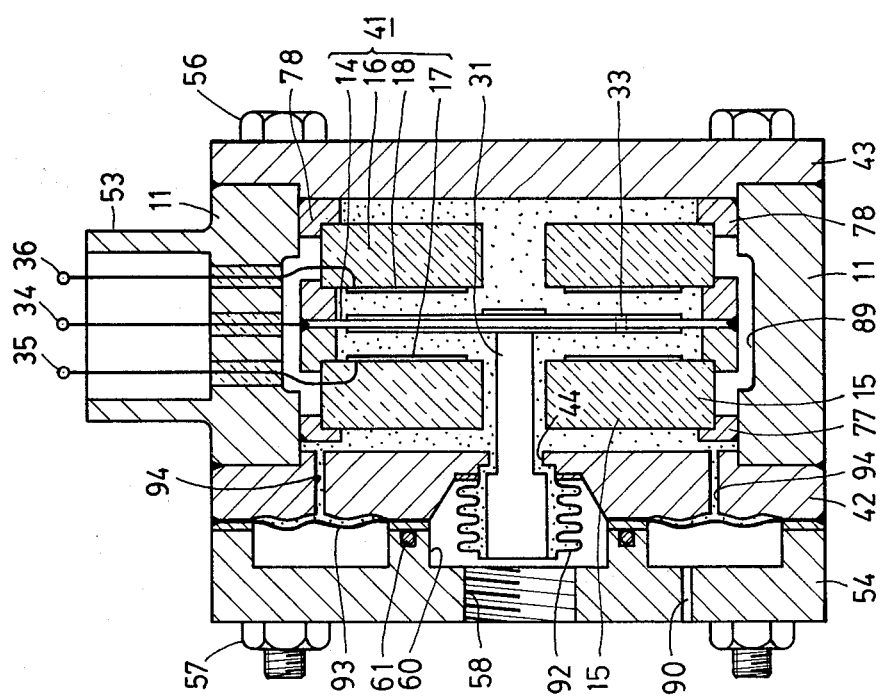
FIG. 5 is a sectional view showing a modified form of the embodiment of FIG. 4 which employs bellows as one of two pressure receiving members and omits the other pressure receiving member.

In the case of detecting a differential pressure relative to the atmospheric pressure, one of the pressure receiving members can be omitted. The pressure receiving member need not always be limited specifically to the diaphragm but may also be a bellows. FIG. 5 shows an arrangement which employs a bellows in place of the diaphragm. An open end of bellows 92 is fixed to the marginal portion of the open end of the through hole 44 of the plate-like member 42 and the coupling shaft 31 is inserted into the bellows 92 and secured at one end to a movable end of the bellows 92. The coupling shaft 31 is reduced in its diameter from the intermediate portion to the side of the plate spring 14 to form a stepped portion, which is engageable with a stepped portion formed in the through hole 44, thereby preventing the bellows 92 from being deflected by an overpressure in excess of a predetermined value. In this embodiment the plate-like member 43 is used to hermetically seal one end of the body 11. Accordingly, as shown in FIG. 5, the plate-like member 43 may be in contact with the outer ring 78 which retains the insulating member 16. The plate-like member 42 and the outer ring 77 are spaced apart. The flange 54 has a cylindrically projecting portion 60 around the pressure inlet port 58 to abut with the plate-like member 42 and the O-ring 61 is disposed in a recess provided in the end face of the projecting portion 60 thereby sealing the space surrounding the bellows 92 from the outer space. In the flange 54 is made a through hole 90, which communicates the atmospheric pressure to the space radially outward of the projecting portion 60. In this example, the pressure of a fluid, which flows from the pressure inlet port 58, is measured relative to the atmospheric pressure.

Further, in this example a diaphragm 93 for temperature compensation use, which has an opening around the bellows 92, is disposed opposite the outside surface of the plate-like member 42 and inner and outer marginal portions of the diaphragm 93 are welded to the plate-like members 42. The diaphragm 93 and the outside surface of the plate-like member 42 have concentric corrugations of the same configurations. The space between the diaphragm 93 and the plate-like member 42 is filled with the sealed fluid 32 through passages 94 formed in the plate-like member 42. However, in this embodiment, the fluid 32 can be replaced with an inert gas. In FIG. 5 a diaphragm may also be used as the pressure receiving member in place of the bellows 92; namely, one of the diaphragms may also be omitted in FIGS. 2 to 4. It is also possible to replace both or one of the diaphragms 21 and 22 with a bellows in FIGS. 2 to 4. In the arrangements shown in FIGS. 2 to 4, when only a low-pressure fluid is applied to the side of one of the diaphragms, the plate-like member on that side may be designed to be held in contact with the displacement transducer 41, namely, the spacing $d_1$ (or $d_2$) on that side can be omitted. In FIG. 5, in order to measure an absolute pressure rather than a relative pressure applied to the inlet port 58, the passages 94, the diaphragm 93 and the through hole 90 are not necessary and the sealed fluid 32 is replaced with vacuum.

Figure 6:
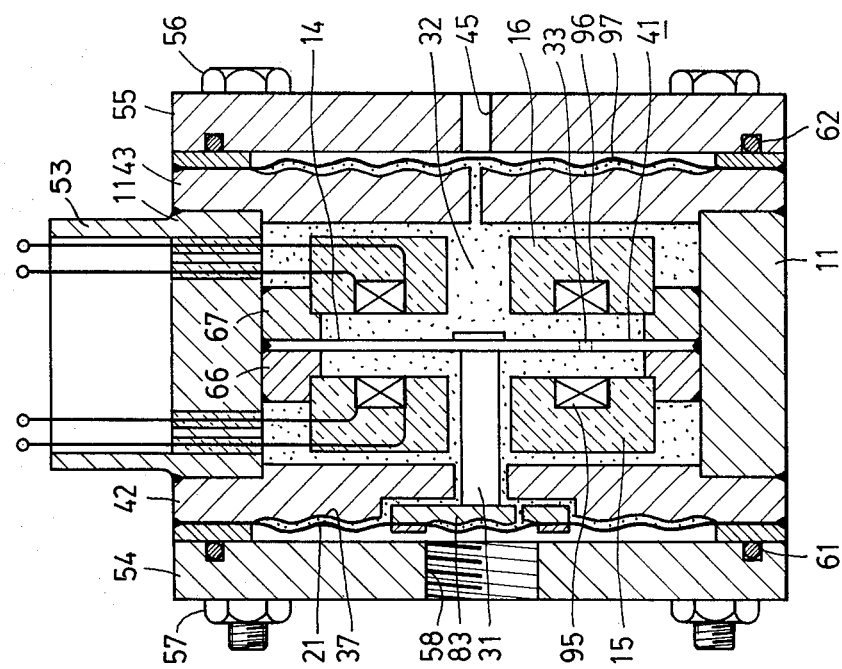
FIG. 6 is a sectional view illustrating another embodiment of the differential pressure gauge of the present invention which employs an inductance type of displacement transducer, a coupling shaft as the pressure transmitting means and one pressure receiving member.

While in the foregoing the electrostatic capacitance type converter is employed as the displacement transducer 41, an inductance type transducer may also be used, as shown in FIG. 6. The plate spring 14 made of a magnetic material is disposed in the body 11 between the plate-like members 42 and 43, and coils 95 and 96 are disposed on both sides of the plate spring 14 in opposing relation thereto. The coils 95 and 96 are embedded in recessed formed in the insulating members 15 and 16 on the side of the plate spring 14. The plate spring 14 and the insulating members 15 and 16 are fixed by the rings 66 and 67 to each other as is the case with FIG. 4, and the plate spring 14, the insulating members 15 and 16 and the coils 95 and 96 constitute an inductance type displacement transducer 41. The insulating members 15 and 16 are fixed by the rings 66 and 67 to the body 11. A diaphragm 97 for temperature compensation use is disposed on the outside of the plate-like member 43 and welded thereto at its marginal portion. Between the plate-like member 43 and the diaphragm 97 is filled the sealed fluid 32 through the through hole 45. The fluid pressure which is applied to the diaphragm 21 is transmitted through the coupling shaft 31 to the plate spring 14 to deflect it, whereby the distances between the plate spring 14 and the coils 95 and 96 vary differentially, causing their inductances to vary differentially. Both ends of the coils 95 and 96 are led out of the body 11 and the fluid pressure is detected as variations in the inductances. Also in this example, bellows may be used as the pressure receiving members and it is possible to provide pressure receiving members on both sides of the body 11 so that a differential pressure may be detected. In FIG. 5 the diaphragm 97 for temperature compensation use may also be mounted on the outside of the plate-like member 43 as in the arrangement of FIG. 6.

It will be apparent that many modifications and variations may be effected without departing from the scope of the novel concepts of this invention.

What is claimed is:

1. A differential pressure gauge comprising:
a tubular body having a terminal box formed on the circumference thereof, said box being unitary with said tubular body and extending outwardly of said circumference;
a first plate-like member having a through hole therein, said first plate-like member being fixed to the tubular body to close one end of said body, said first plate-like member and said tubular body being provided with portions that abut one another in a plane perpendicular to the axis of said tubular body;
a second plate-like member fixed to the tubular body to close the other end thereof;
a displacement transducer fixedly mounted on the tubular body within a region defined by the tubular body and the first and second plate-like members, the opposing sides of said displacement transducer being disposed in facing relation respectively to surfaces of said first and second plate-like members and being spaced from said surfaces of said first and second plate-like members by intervening air gaps operative to assure that any deformation of either of said plate-like members is incapable of achieving contact between said surface of said plate-like member and the facing side of said transducer, a first pressure receiving member mounted on the tubular body on the outside of the first plate-like member;

first pressure transmitting means for transmitting to the displacement transducer an external pressure received by the first pressure receiving member; and first limiting means for receiving by the first plate-like member a deflection of the first pressure receiving member in excess of a predetermined value caused by an overpressure from the outside, whereby the overpressure received by the first plate-like member is supported by the tubular body.

2. A differential pressure gauge according to claim 1 wherein a through hole is made in the second plate-like member; a second pressure receiving member is mounted on the tubular body on the outside of the second plate-like member; second pressure transmitting means is provided for transmitting to the displacement transducer a pressure received by the second pressure receiving means; the displacement transducer is arranged so that a displacement corresponding to a difference between the pressures transmitted by the first and second pressure transmitting means is converted into an electric signal; and second limiting means is provided for receiving by the second plate-like member a displacement of the second pressure receiving member in excess of a predetermined value caused by an overpressure from the outside.

3. A differential pressure gauge according to claim 1 wherein one side of each of the first and second plate-like members is attached to one end face of the tubular body and hermetically sealed at its marginal edge; and the pressure receiving member mounted on the plate-like member is fixed thereto.

4. A differential pressure gauge according to claim 1 wherein each of the first and second plate-like members is disposed in the tubular body and fixed thereto; and the pressure receiving member mounted on the plate-like member is fixed to the tubular body.

5. A differential pressure gauge according to one of claims 1 or 2 wherein the pressure receiving member is a diaphragm having concentric corrugations; and the surface of the plate-like member confronting the diaphragm has the same concentric corrugations as those of the diaphragm to constitute the limiting means.

6. A differential pressure gauge according to one of claims 1 or 2 wherein the pressure receiving member is a bellows; the pressure transmitting means is a coupling shaft which is coupled at one end with a movable end of the bellows and coupled at the other end to the displacement transducer; and the limiting means is arranged so that when the coupling shaft deflects in excess of a predetermined value, it engages with the plate-like member having inserted thereinto the coupling shaft, thereby to receive the deflection.

7. A differential pressure gauge according to one of claims 1 or 2 wherein the pressure transmitting means is an incompressible fluid sealed in the room.

8. A differential pressure gauge according to one of claims 1 or 2 wherein the pressure transmitting means is a coupling shaft which couples together the pressure receiving member and the displacement transducer.

9. A differential pressure gauge according to one of claims 1 or 2 wherein the displacement transducer is an electrostatic type that deflects a moving electrode in accordance with a pressure transmitted by the pressure transmitting means and converts the displacement of the moving electrode into an electrostatic capacitance between the moving electrode and a fixed electrode confronting it.

10. A differential pressure gauge according to claim 9 wherein the fixed electrode is provided on either side of the moving electrode; the fixed electrodes are each held on one side of each insulating member; the insulating members are respectively fitted in cup-shaped electrode support members; the moving electrode is held at its marginal portion between end faces of the electrode support members; the electrode support members are fixed to the tubular body; and the air gaps are formed between the other end face of each of the electrode support members and each of the plate-like members.

11. A differential pressure gauge according to claim 9 wherein the fixed electrode is disposed on either side of the moving electrode; the fixed electrodes are each held on one side of each insulating member; the insulating members are respectively fitted in fixing rings; the fixing rings hold therebetween the marginal portion of the moving electrode to support it; and the air gaps are provided between each of the insulating members and each of the plate-like members.

12. A differential pressure gauge according to claim 11 wherein the moving electrode is fixed by welding to the fixing rings; circular slits are respectively formed in the rings on the opposite side from the moving electrode to form rims of reduced rigidity radially thereof inside of the slits; the insulating members are respectively pressed in the rims; and pressures by the press fit are absorbed by the rims.

13. A differential pressure gauge according to claim 11 wherein outer rings are respectively fixed to the insulating members on the opposite side from the moving electrode and apart from the fixing rings and fixed to the tubular body; and a lead for the moving electrode is led out of the tubular body while being electrically insulated therefrom.

14. A differential pressure gauge according to one of claims 1 or 2 wherein the displacement transducer is an inductance type comprising a magnetic member which is deflected by a pressure transmitted by the pressure transmitting means and a coil whose inductance value varies with the deflection of the magnetic member.

15. A differential pressure gauge according to claim 1 wherein the second plate-like member is a cover for hermetic seal use.

16. A differential pressure gauge according to one of claims 1 or 2 wherein the said region is filled with an incompressible fluid; a through hole is made in the second plate-like member; and temperature compensating means is provided on the outside of the second plate-like member for absorbing expansion and contraction of the incompressible fluid.

* * * * *